US008415432B1

(12) United States Patent
Mruk et al.

(10) Patent No.: US 8,415,432 B1
(45) Date of Patent: Apr. 9, 2013

(54) RUBBER COMPOSITION AND PNEUMATIC TIRE

(75) Inventors: Ralf Mruk, Lipperscheid (LU); Frank Schmitz, Bissen (LU); Robert Fokko Roskamp, Trier (DE); Alexandra Hermann, Mainz (DE); Rudolf Wilhelm Zentel, Nierstein (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 13/333,202

(22) Filed: Dec. 21, 2011

(51) Int. Cl.
*C08L 9/00* (2006.01)
*C08L 9/02* (2006.01)
*C08L 23/00* (2006.01)
*C08L 25/02* (2006.01)

(52) U.S. Cl. ......... 525/232; 525/233; 525/240; 525/241

(58) Field of Classification Search .................. 525/232, 525/233, 240, 241
See application file for complete search history.

(56) References Cited

U.S. PATENT DOCUMENTS

| 4,937,290 | A | 6/1990 | Bauer et al. ............ 525/184 |
| 6,486,213 | B1 | 11/2002 | Chen et al. ............ 514/772.1 |
| 7,045,578 | B2 * | 5/2006 | Karato et al. ............ 525/331.9 |
| 7,230,063 | B1 | 6/2007 | Parker ............ 526/346 |
| 7,399,801 | B2 | 7/2008 | Tsuji et al. ............ 524/392 |
| 7,666,962 | B2 | 2/2010 | Le et al. ............ 526/193 |
| 7,847,019 | B2 | 12/2010 | David et al. ............ 525/54.1 |
| 7,943,680 | B2 | 5/2011 | Bowman et al. ............ 522/6 |
| 2007/0225447 | A1 | 9/2007 | Farnham et al. ............ 525/328.2 |
| 2007/0232783 | A1 | 10/2007 | Moad et al. ............ 528/480 |

FOREIGN PATENT DOCUMENTS

| EP | 0583814 | 2/1994 |
| GB | 785631 | 10/1957 |
| GB | 0629649 | 12/1994 |
| JP | 60188411 | 9/1985 |

OTHER PUBLICATIONS

Kryger, Matt, "Applications of Thiol-ENE Coupling", *Abstract*, Dec. 11, 2008, pp. 1-8, Retrieved from the Internet, http://www.chemistry.illinois.edu/research/organic/seminar_extracts/2008_2009/Matt_Kryger_Chem535_FA08_Abstract.pdf *whole document* .
Moad, Graeme et al., "Living Radical Polymerization by the RAFT process", *Australian J. Chemistry* 2005, vol. 58, pp. 379-410, Retrieved from the Internet: URL: http://www.publish.csiro.au/journal/ajc *whole document*.
Lutz, Jean-Francois, "Modular Chemical Tools for Advanced Macromolecular Engineering", *Polymer*, vol. 49, Issue 4, Feb. 18, 2008, pp. 817-824.
Harrisson, Simon, "Radical-Catalyzed Oxidation of Thiols by Trithiocarbonate and Dithioester RAFT Agents: Implications for the Preparation of Polymers with Terminal Thiol Functionality", *Macromolecules*, Jan. 13, 2009.
Bivigou-Koumba, Achille M. , et al. "Sythesis of Symmetrical Triblock Copolymer of Stryene and N-isopropylacrylamide Using Bifunctional Bis(trithiocarbonate) as RAFT Agents" *Macromolecular Journals*,, Jan. 13, 2009, pp. 565-578, Retrieved from the Internet: URL: http://www.mme-journal.de *whole document*.
Mori, Noriko, et al., "Temperature-Induced Changes in the Surface Wettability of SBR + PNIPA Films", *Macromolecular Materials and Engineering*, 2007, vol. 292, pp. 917-922, Retrieved from the Internet: URL: http://www.mme-journal.de *whole document*.
Brummelhuis, Niels ten et al., "Thiol#Ene Modification of 1,2-Polybutadiene Using UV Light or Sunlight", *Macromolecules*, 2008, 41, pp. 9946-9947, Retrieved from the Internet: URL: http://iwww.pubs.acs.org *whole document*.

* cited by examiner

*Primary Examiner* — Nathan M Nutter
(74) *Attorney, Agent, or Firm* — John D. DeLong (57) ABSTRACT

The present invention is directed to a vulcanizable rubber composition comprising: a diene based elastomer; and a compound of formula I

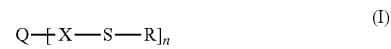

where Q is an n-valent organic group of 1 or more carbon atoms and optionally one or more of nitrogen, oxygen, sulfur, halogen, silicon, and phosphorus atoms;
X is a divalent polymer group capable of exhibiting a lower critical solution temperature;
R is independently a hydrogen atom or a monovalent group of formula (II)

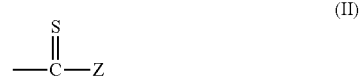

where Z is a monovalent organic group of 1 or more carbon atoms and optionally one or more of nitrogen, oxygen, sulfur, halogen, silicon, and phosphorus atoms; and
n is an integer greater than or equal to 2.
The invention is further directed to a rubber composition comprising the reaction product of a diene based elastomer and a compound of formula I, and a pneumatic tire with a tread comprising the rubber composition.

15 Claims, 4 Drawing Sheets

RUBBER COMPOSITION AND PNEUMATIC TIRE

BACKGROUND OF THE INVENTION

In the ongoing effort to improve tire design, there is a recognized tension among tire performance, rolling resistance (or fuel economy), and treadwear. Typically, for use in a consumer tire, a tread compound is designed to optimized between these three considerations. However, efforts to improve for example fuel economy often lead to compromises in performance and/or treadwear. For higher performance tires desired by driving enthusiasts, the achievement better performance often comes with a compromise in treadwear or fuel economy. There is a desire therefore to develop tread compounds that can achieve improvement in any of performance, fuel economy, and treadwear with little or no compromise in the other two. One approach is in the elastomeric polymers used in the tread compound.

Aqueous solutions of a variety of polar aprotic polymers exhibit a lower critical solution temperature (LCST). When these solutions are heated above the LCST, the intramolecular hydrogen bonding is preferred compared to the hydrogen bonding with water molecules. This leads to collapse of the polymer coils and a precipitation of the polymer from solution. This phase transition is reversible so that the polymer redissolves when the temperature is again decreased below the LCST. A well-known example for an LCST polymer is poly(N-isopropyl acrylamide) (PNIPAM). Aqueous solutions of this polymer exhibit an LCST transition at about 33° C.

The combination of LCST polymers with elastomers offers the possibility of better control of elastomer performance in a variety of applications where the elastomer is exposed to water. Simple mixing of an LCST polymer with an elastomer results in a compound that will experience macrophase separation due to the lack of covalent bonds between the LCST polymer and the elastomer. Such a macrophase separation will most likely have a detrimental effect on tread compound properties.

SUMMARY OF THE INVENTION

The present invention is directed to a vulcanizable rubber composition comprising: a diene based elastomer; and a compound of formula I (I)

where Q is an n-valent organic group of 1 or more carbon atoms and optionally one or more of nitrogen, oxygen, sulfur, halogen, silicon, and phosphorus atoms;
X is a divalent polymer group capable of exhibiting a lower critical solution temperature;
R is independently a hydrogen atom or a monovalent group of formula (II)

(II)

where Z is a monovalent organic group of 1 or more carbon atoms and optionally one or more of nitrogen, oxygen, sulfur, halogen, silicon, and phosphorus atoms; and
n is an integer greater than or equal to 1.

The invention is further directed to a method of making a rubber composition, comprising the step of: mixing a diene based elastomer with a compound of formula 1.

The invention is further directed to a rubber composition comprising the reaction product of a diene based elastomer and a compound of formula I, and a pneumatic tire with a tread comprising the rubber composition.

DETAILED DESCRIPTION

There is disclosed a vulcanizable rubber composition comprising: a diene based elastomer; and a compound of formula I (I)

where Q is an n-valent organic group of 1 or more carbon atoms and optionally one or more of nitrogen, oxygen, sulfur, halogen, silicon, and phosphorus atoms;
X is a divalent polymer group capable of exhibiting a lower critical solution temperature;
R is independently a hydrogen atom or a monovalent group of formula (II)

(II)

where Z is a monovalent organic group of 1 or more carbon atoms and optionally one or more of nitrogen, oxygen, sulfur, halogen, silicon, and phosphorus atoms; and
n is an integer greater than or equal to 1.

There is further disclosed a rubber composition comprising the reaction product of a diene based elastomer and a compound of formula I, and a pneumatic tire with a tread comprising the rubber composition.

In one embodiment, the rubber composition includes a compound of formula I (I)

where Q is an n-valent organic group of 1 or more carbon atoms and optionally one or more of nitrogen, oxygen, sulfur, halogen, silicon, and phosphorus atoms;
X is a divalent polymer group capable of exhibiting a lower critical solution temperature;

R is independently a hydrogen atom or a monovalent group of formula (II)

(II)

where Z is a monovalent organic group of 1 or more carbon atoms and optionally one or more of nitrogen, oxygen, sulfur, halogen, silicon, and phosphorus atoms; and
n is an integer greater than or equal to 1.

In one embodiment, the polymer X capable of exhibiting a lower critical solution temperature (LCST) includes homopolymers and copolymers of various second monomers known to have LCST behavior, including but not limited to polymers of: acrylamides and substituted acrylamides, methacrylamides and substituted methacrylamides, acrylic acids and substituted acrylic acids, methacrylic acids and substituted methacrylic acids, vinyl alkyl ethers and substituted vinyl alkyl ethers, vinyl caprolactams and substituted vinyl caprolactams, and other monomers known to lead to polymers with LCST behavior, such as oligo(ethylene glycol) methacrylate and 2-(2-methoxyethoxy)ethyl methacrylate, and the like.

By "capable of exhibiting a lower critical solution temperature (LCST)," it is meant that in the presence of water, the polymer X associates with the water to form a water-swollen polymer phase, wherein the water-swollen polymer phase will show an LCST transition when heated from a temperature below the LCST to a temperature above the LCST. The polymer X is accordingly capable of exhibiting an LCST when the polymer X exists as a side chain on the graft copolymer.

In one embodiment, the polymer X is a polymer of a second monomer of formula III (III)

where $R^1$ and $R^2$ are independently selected from the group consisting of hydrogen, C2 to C6 linear alkyl, C2 to C6 branched alkyl, and C3 to C6 cycloalkyl, with the proviso that at least one of $R^1$ and $R^2$ is not hydrogen.

In one embodiment, X is of formula (IV)

(IV)

where $R^1$ and $R^2$ are independently selected from the group consisting of hydrogen, C2 to C6 linear alkyl, C2 to C6 branched alkyl, and C3 to C6 cycloalkyl, with the proviso that at least one of $R^1$ and $R^2$ is not hydrogen, and m is the degree of polymerization of the hydrocarbon chain.

In one embodiment, the polymer X is a polymer of an N-substituted acrylamide derivative.

In one embodiment, the polymer X is a polymer of N-isopropylacrylamide, N-cyclopropylacrylamide, or N,N-diethylacrylamide.

In one embodiment, the polymer X capable of exhibiting a lower critical solution temperature has a weight average molecular weight ranging from about 500 to about 20000 g/gmol.

In one embodiment, the polymer X capable of exhibiting a lower critical solution temperature has a lower critical solution temperature in a range of from about 0° C. to about 100° C.

In one embodiment, the compound of formula I is present in the rubber composition in an amount ranging from 0.5 to 10 phr.

The term "phr" as used herein, and according to conventional practice, refers to "parts by weight of a respective material per 100 parts by weight of rubber, or elastomer."

Generally, the —S—R grouping in the compound of formula I originates as a terminal functional group of the polymer X. Thus, as the compound of formula I exists as a reaction product with a diene based elastomer, S links X to the diene based elastomer after cleavage of R from the compound. Such a terminal functional group may be incorporated into the polymer X during polymerization, for example, through use of a suitable chain transfer agent or terminating agent as is known in the art.

The compound of formula I may be produced by various methods. In order to allow a reaction of the compound of formula I with the diene based elastomer, the compound of formula I with LCST polymer X features thiol end groups. These end groups can be introduced by reaction of thiocarbonylthio endgroups with nucleophilic agents. Polymers exhibiting thiocarbonylthio end groups can be produced by reversible addition-fragmentation chain transfer (RAFT) polymerization. One reaction scheme describes the use of PNIPAM as LCST polymer, however, this invention is not limited to that as any LCST polymer with a reactive end group, which for example can be produced by RAFT polymerization, can be used for the functionalization of the elastomer.

In one embodiment, the terminal functional group —S—R of the compound of formula I is incorporated during polymerization through the mechanism of reversible addition-fragmentation chain transfer (RAFT). More details of the RAFT polymerization mechanism may be found by reference to Moad et al., *Aust. J. Chem.* 2005, 58, 379-410. As is known in the art, RAFT polymerization of free-radical polymerizable monomers is accomplished in the presence of a thiocarbonylthio RAFT chain transfer agent of general formula (V)

(V)

where Q' is a free radical leaving group able to reinitiate polymerization, and Z is as defined for formula II and is a functional group that influences the rate of radical addition and fragmentation, and m is an integer greater or equal to 1. Suitable thiocarbonylthio RAFT chain transfer agents include dithioesters, trithiocarbonates, dithiocarbamates, and xanthates. Suitable RAFT chain transfer agents are known in the art, for example as disclosed in Moad et al., *Aust. J. Chem.* 2005, 58, 379-410; U.S. Pat. Nos. 7,399,801; 7,666,962; U.S. Publications 2007/0225447; 2007/0232783. Multifunctional RAFT agents are known, as disclosed for example in Bivigou-Koumba et al., *Macromolecular Chemistry and Physics* 2009, 210, 565-578.

Upon RAFT polymerization in the presence of a suitable thiocarbonylthio chain transfer agent, the compound with LCST polymer has the general formula (VI)

where X represents a polymer chain exhibiting a LCST.

In one embodiment, the compound of formula I has n equal to 1. In this embodiment, the compound of formula I, when suitably cleaved to form thiol radicals, will react with a diene based elastomer having unsaturated carbon-carbon bonds to form a graft copolymer with pendant side chains having LCST character. Q as defined in formula I is then identical to Q' in formula V, and n is identical to m.

In one embodiment, the compound of formula I has n greater than or equal to 2. In this embodiment, the compound of formula I, when suitably cleaved to form thiol radicals, will react with a diene based elastomer having unsaturated carbon-carbon bonds to form a crosslinked structure within the elastomeric matrix. Q as defined in formula I then may be identical to Q' in formula V for m greater than or equal to 2 (m is identical to n in this case). Alternatively, for m=1 in the RAFT chain transfer agent of formula V, at least two species of the RAFT chain transfer agent of formula V may be combined to form a multifunctional RAFT agent with n greater than or equal to 2. In this instance, Q' in formula V contains suitable functional groups to allow linkage between multiple Q', to form the Q of formula I. For example, for Q' having a carboxylic acid group, the carboxylic acid groups of two species of formula V may be esterified by reaction with a diol such as propanediol in the presence of diisopropylcarbodiimide (DIC) to form a diester linkage as Q in formula I with n=2.

The chain terminated polymeric compound of formula I may be reacted with a suitable nucleophile to cleave the C—S linkage to obtain the compound of formula (VII) having a terminal thiol group In one embodiment, the chain terminated polymer of formula VI is treated by aminolysis to obtain the thiol-terminated polymer of formula VII.

In its thiol form shown in formula VII, the compound is combined in the rubber composition with the diene based elastomer during rubber mixing as for example in a Banbury mixer, rubber mill or the like. No solvent is required and is generally excluded. During reacting of the thiol terminated polymer of compound VII with the diene based elastomer, the compound of formula VII reacts with the diene based elastomer through reaction of a terminal thiol groups of the compound of formula VII with the unsaturated carbon-carbon bond of the diene based elastomer. For n greater than or equal to 2, the compound of formula VII crosslinks with the diene based elastomer through reaction of a terminal thiol groups of the compound of formula VII with the unsaturated carbon-carbon bond of the diene based elastomer.

In one embodiment, the thiol-terminated compound VII is reacted with the diene based elastomer in the presence of a free-radical initiator via a thiol-ene reaction as is known in the art, see for example *Macromolecules* 2008, 41, 9946-9947. In one embodiment, the free-radical initiator is selected from the group consisting of 2,4,6-Trimethylbenzoyldiphenylphosphine oxide and azobisisobutyonitrile (AIBN).

Alternatively, the crosslinking reaction may occur by adding the compound of formula I to the rubber composition in its uncleaved form. In the presence of suitable nucleophile such as diphenylguanidine or a phenylene diamine compound, the thioester of formula I may be cleaved in situ during the rubber mixing and curing process, thereby exposing the thiol radical to react with the diene based elastomer.

The rubber composition includes, in addition to the compound of formula I, one or more diene based elastomers. The phrases "rubber or elastomer containing olefinic unsaturation" or "diene based elastomer" are equivalent and are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, c is 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, c is 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The rubber composition may include from about 10 to about 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. Examples of suitable sulfur containing organosilicon compounds are of the formula:

VIII in which Z' is selected from the group consisting of where $R^3$ is an alkyl group of 1 to 4 carbon atoms, cyclohexyl or phenyl; $R^4$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxysilylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula VIII, Z' may be where R⁴ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The invention is further illustrated by the following non-limiting examples.

EXAMPLE 1

In this example, preparation of poly-(N-isopropylacrylamide), or PNIPAM, with a bifunctional RAFT chain transfer agent is illustrated.

RAFT-polymerization was used for the preparation of PNIPAM. For this purpose the following chain transfer agent (CTA) was prepared: S-1-Dodecyl-S-(αα'-dimethyl-α"-acetic acid)trithiocarbonate (DMP) The DMP was then linked into a bifunctional CTA through reaction with 1,3-propanediol.

Synthesis of Chain Transfer Agent DMP

S-1-Dodecyl-S-(αα'-dimethyl-α"-acetic acid)trithiocarbonate was synthesized in one step. using literature procedure [J. T. Lai, D. Filla, R. Shea, *Macromolecules* 2002, 35, 6754.]

Yield: 61%

$^1$H-NMR (CDCl$_3$/300 MHz): δ[ppm]: 0.85 (t, 3H); 1.16-1.47 (m, 20H); 1.71 (s, 6H); 3.26 (t, 2H); 13.05 (s, 1H)

Preparation of Bifunctional CTA Based on DMP

DMP was reacted with 1,3-propanediol in the presence of N,N'-diisopropylcarbodiimide (DIC) and 4-pyrrolidinopyridine in dichloromethane to form the bifunctional CTA according to Scheme I 0.5 g (0.0014 mol) S-1-Dodecyl-S-(αα'-dimethyl-α"-acetic acid)trithiocarbonate (DMP), 0.17 g (0.0014 mol) N,N'-Diisopropylcarbodiimid (DIC) and 0.02 g (0.00014 mol) 4-Pyrrolidinopyridine were dissolved in 10 ml CH$_2$Cl$_2$ under nitrogen atmosphere. The solution was cooled to 0° C. and 0.05 g (0.0007 mol) 1,3-Propandiol were added. The solution was stirred for 18 hours followed by filtration. The filtrate was washed with water (20 ml), 5% acetic acid (20 ml) and again with water (20 ml), dried over MgSO$_4$ and the solvent was evaporated. The crude product was purified by column chromatography (CHCl$_3$/Hexane 4:1).

Scheme I

$^1$H-NMR (CDCl$_3$/300 MHz): δ[ppm]: 0.85 (t, 6H); 1.16-1.40 (m, 36H); 1.54-1.71 (m, 16H); 1.94 (t, 2H); 3.24 (t, 4H); 4.11 (t, 4H)

Analysis by field desorption (FD) mass spectroscopy showed a peak at 768.8 confirming the formation of the bifunctional CTA.

Synthesis of PNIPAM-CTA

Preparation of PNIPAM Using the Bifunctional CTA was Done According to Scheme II:

Scheme II

Figure 1:
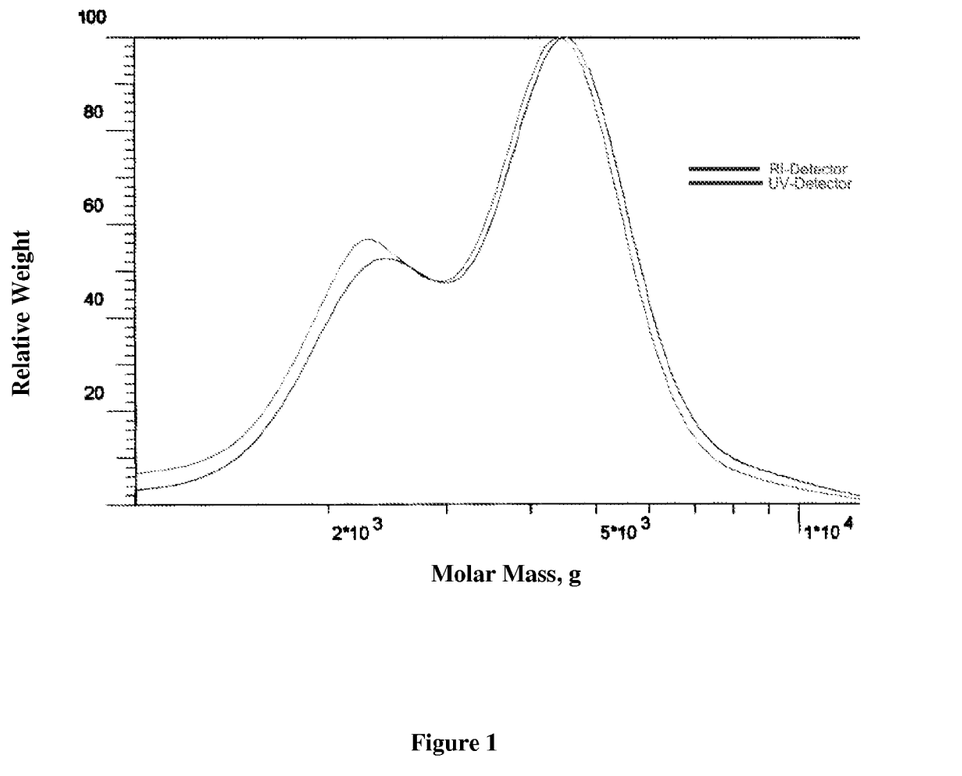
FIG. 1 shows GPC curves for a bifunctional RAFT chain transfer agent.

The PNIPAM-polymers was prepared in a Schlenk tube containing N-isopropyacrylamide, the bifunctional CTA, AIBN and dry dioxane as a solvent. After three freeze-pump thaw cycles the mixture was placed in a preheated oil bath at 80° C. for 24 hours. The mixture was precipitated in hexane (poor solvent)/THF (good solvent) three times and dried under vacuum. The molar ratio of used NIPAM (N-isopropylacrylamide) monomer, CTA, AIBN and dioxane was (1:60:600). The yield of 96% refers to the amount of monomer used. Molecular weight was measured by GPC in DMF using PMMA as calibration. A bimodal distribution of molecular weight with a major peak at 3295 g/mol was observed, as shown in FIG. 1. This suggests that some polymerization of the monomer proceeded from only one side of the bifunctional CTA.

Figure 2:
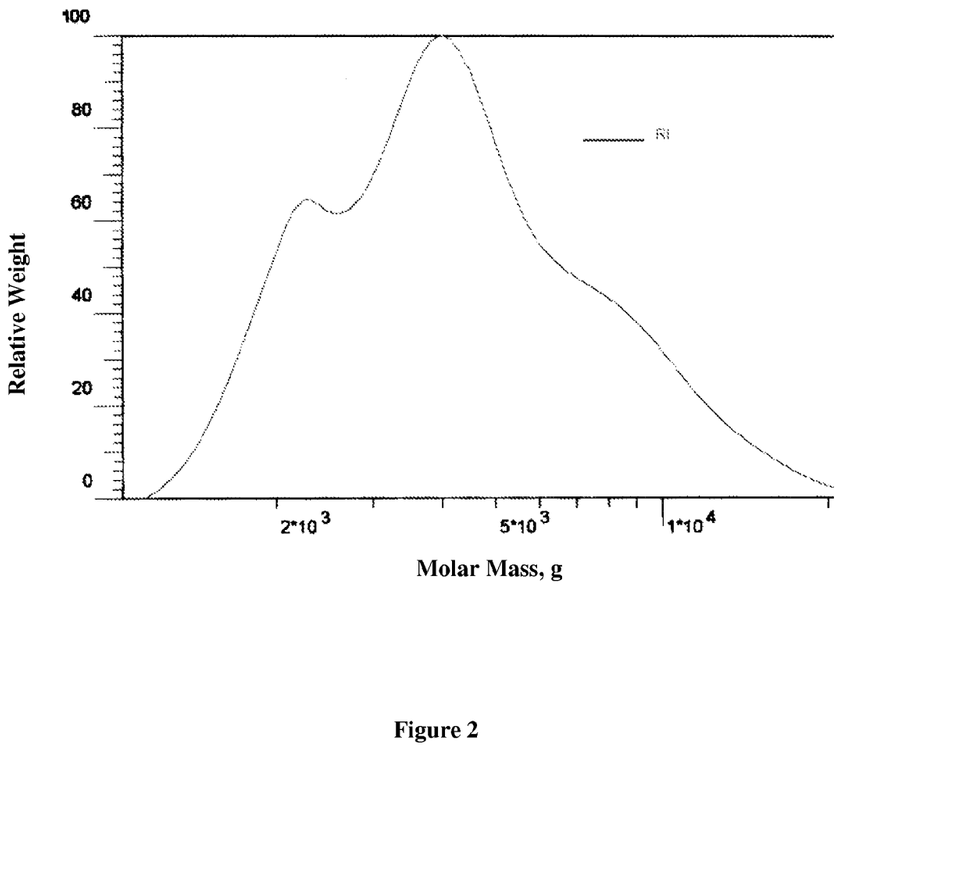
FIG. 2 shows a GPC curve for a bifunctional RAFT chain transfer agent after cleavage to a thiol.

The cleavage of the trithiocarbonate end group was done by aminolysis. The aminolysis was performed by stirring a mixture of PNIPAM-CTA and hexylamine in dry dioxane for several hours at room temperature. The stability of the main chain ester bonds under the conditions of the trithiocarbonate cleavage was confirmed by GPC showing a major peak at 3644 g/mol as shown in FIG. 2.

EXAMPLE 2

In this example, reaction of a styrene-butadiene rubber with thiol-endfunctionalized PNIPAM is illustrated. The bis-thiol-endfunctionalized PNIPAM (the cleaved form of the PNIPAM-CTA) of Example 1 (0.5 g), 2 g of styrene-butadiene rubber (internally prepared)) and AIBN (0.05 g) were dissolved in dry THF. The solution was degassed by a stream of argon of 1.5 hours. The reaction mixture was placed in a preheated oil bath at 65° C. for 30 hours. After that, a complete gellation of the reaction mixture was observed.

EXAMPLE 3

In this example, the effect of PNIPAM-functionalization on the wettability of a styrene-butadiene rubber is illustrated. Wettability of the SBR functionalized with bis-thiol-endfunctionalized PNIPAM was determined by measuring the contact angle of water droplets on a glass plate coated with the functionalized polymer.

Contact angle was measured with the following procedure. The functionalized SBR samples were swollen in THF and spin-coated on a glass slide. After drying in vacuum the slides were placed under a needle and a water droplet was purged out of the needle onto the coated glass. The contact angle was determined by measurement of the inner angle between the droplet and the glass surface. Contact angle was measured for each of the series of functionalized SBR at two temperatures, 22° C. and 45° C. These temperatures were chosen as being well below and above the 32° C. LCST for PNIPAM. Contact angle was measured for the functionalized SBR and control SBR at two temperatures, 22° C. and 45° C. These temperatures were chosen as being well below and above the 32° C. LCST for PNIPAM. Contact angle measurements are given in Table 1.

TABLE 1

| Sample | Contact Angle at 22 C. | Contact Angle at 45 C. | Diff, ° |
|---|---|---|---|
| SBR-PNIPAM | 72 | 87 | 15 |
| SBR | 105 | 106 | 1 |

The relative difference in contact angle above and below the LCST as shown in Table 1 illustrates the greater hydrophilic behavior for the PNIPAM functionalized SBR as compared with the unfunctionalized SBR.

EXAMPLE 4

A bifunctional PNIPAM-thiol was prepared following the procedures of Example 1. Molecular weight of the resulting PNIPAM thiol was determined to be 7200 g/mol by GPC.

The PNIPAM-thiol was mixed with 19 M NaOH to hydrolyze the ester linkages. Molecular weight of the resulting hydrolysate was determined to be 3100 g/mol, confirming the essentially symmetric polymerization of the NIPAM from both sides of the bifunctional chain transfer agent.

EXAMPLE 5

In this example, reaction of a styrene-butadiene rubber with PNIPAM-SH is illustrated The difunctional PNIPAM-thiol (the cleaved form of the PNIPAM-CTA) of Example 1 (0.5 g), 2 g of styrene-butadiene rubber (internally produced)) and AIBN (0.05 g) were dissolved in dry THF. The solution was degassed by a stream of argon of 1.5 hours. The reaction mixture was placed in a preheated oil bath at 65° C. for 30 hours. The resulting rubber composition was observed to form a gel in THF that adhered to the upper surface of an inverted vial containing the material, confirming crosslinking of the SBR with the PNIPAM-thiol. Upon addition of 2 drops of 25% ammonia and sitting for 12 hours, the gel dissolved indicating hydrolysis of the ester linkages.

EXAMPLE 6

In this example, rheological properties of a rubber composition including the reaction product of PNIPAM-SH and SBR is illustrated.

Figure 3:
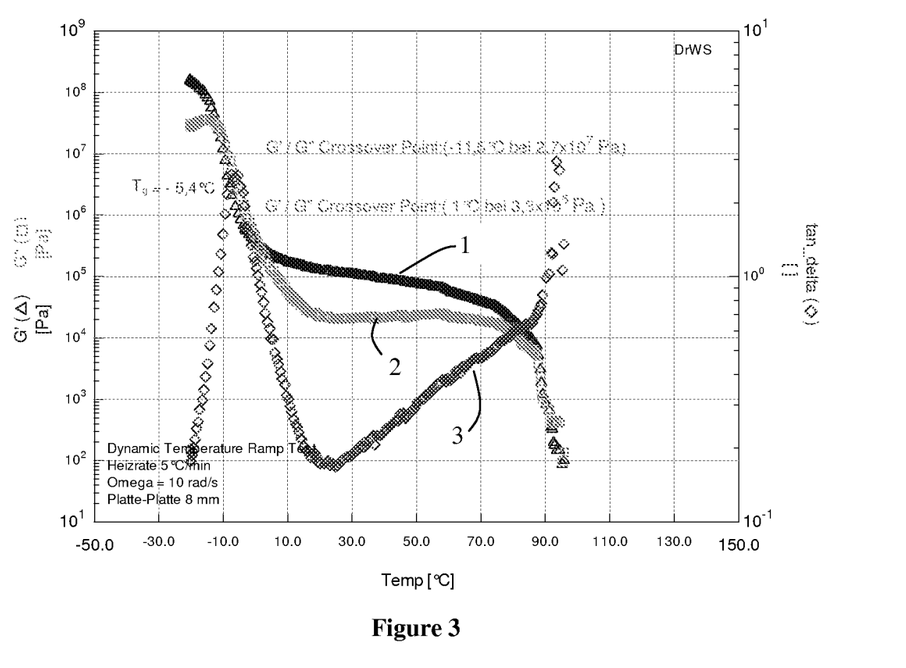
FIG. 3 shows rheological curves for an SBR.
Figure 4:
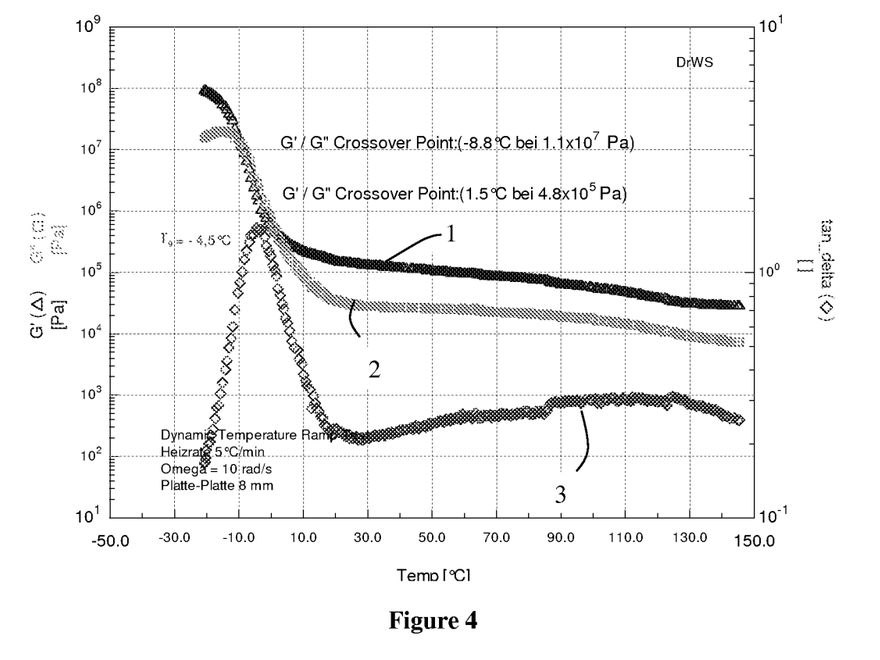
FIG. 4 shows rheological curves for an SBR crosslinked with a bifunctional LCST compound.

Rheological measurements were performed using a parallel plate rheometer (8 mm plates) and a heating rate of 5° C. per minute to investigate the influence of PNIPAM on the mechanical behavior of the SBR. FIG. 3 shows the typical rheological behavior of unmodified SBR, with a drop of G' (1) and G" (2) and increase in tan delta (3) at temperatures above about 70° C. Such behavior indicates flow of the unmodified polymer at the higher temperatures. FIG. 4 shows the rheological behavior of the rubber composition of Example 5. As seen in FIG. 4, crosslinking of PNIPAM with the SBR leads to a stabilization of the high temperature (above about 70° C.) rubbery plateaus at for G' (1), G" (2) and tan delta (3).

EXAMPLE 7

The behavior illustrated in FIGS. 3 and 4 suggests that through the use of the copolymer showing LCST behavior, the usual compromise between tire performance, rolling resistance (an indicator of fuel economy) and treadwear may be avoided, by decoupling the various compound indicators.

A tread compound including the rubber composition showing LCST behavior may be expected to show the following in a tire. Using a tread comprising the copolymer, a tire tread in contact with a wet surface at a temperature below the LCST of the PNIPAM groups may be expected to show enhanced wet grip compared to an otherwise identical tire not including the copolymer. However, the abrasion and rolling resistance would be not be severely compromised. While not wishing to be bound by any theory, the enhanced wet grip is though to be due to softening of the tread surface due to the effect of the water on the LCST groups of the rubber composition. Since this softening is reversible and the tread will thus stiffen under dry conditions, treadwear should not be compromised as the treadwear is largely independent of the transition between LCST states of the PNIPAM at the tread surface. The stiffening is due both to the precipitation of the LCST groups as well as the reinforcing effect discussed in Example 4. Further, since the softening effect due to the LCST groups is likely a surface phenomenon without extension into the bulk of the tread compound, the rolling resistance of the tread is thought to be independent of the transition between LCST states of the rubber composition at the tread surface

What is claimed is:

1. A vulcanizable rubber composition comprising:
a diene based elastomer; and
a compound of formula I where Q is an n-valent organic group of 1 or more carbon atoms and optionally one or more of nitrogen, oxygen, sulfur, halogen, silicon, and phosphorus atoms;
X is a divalent polymer group capable of exhibiting a lower critical solution temperature;
R is independently a hydrogen atom or a monovalent group of formula (II)

where Z is a monovalent organic group of 1 or more carbon atoms and optionally one or more of nitrogen, oxygen, sulfur, halogen, silicon, and phosphorus atoms; and
n is an integer greater than or equal to 2.

2. A rubber composition comprising the reaction product of a diene based elastomer and a compound of formula I where Q is an n-valent organic group of 1 or more carbon atoms and optionally one or more of nitrogen, oxygen, sulfur, halogen, silicon, and phosphorus atoms;
X is a divalent polymer group capable of exhibiting a lower critical solution temperature;
R is independently a hydrogen atom or a monovalent group of formula (II)

where Z is a monovalent organic group of 1 or more carbon atoms and optionally one or more of nitrogen, oxygen, sulfur, halogen, silicon, and phosphorus atoms; and
n is an integer greater than or equal to 2.

3. The rubber composition of claim 2, wherein said reaction product comprises the replacement of at least one R with a covalent bond between the compound of formula I and the diene based elastomer.

4. A pneumatic tire comprising at least one component, the at least one component comprising a rubber composition comprising the reaction product of a diene based elastomer and a compound of formula I where Q is an n-valent organic group of 1 or more carbon atoms and optionally one or more of nitrogen, oxygen, sulfur, halogen, silicon, and phosphorus atoms;
X is a divalent polymer group capable of exhibiting a lower critical solution temperature;
R is independently a hydrogen atom or a monovalent group of formula (II)

where Z is a monovalent organic group of 1 or more carbon atoms and optionally one or more of nitrogen, oxygen, sulfur, halogen, silicon, and phosphorus atoms; and n is an integer greater than or equal to 2.

5. The pneumatic tire of claim 4, wherein said reaction product comprises the replacement of at least one R with a covalent bond between the compound of formula I and the diene based elastomer.

6. The pneumatic tire of claim 4, wherein the at least one component is selected from the group consisting of tread, sidewall, apex, chafer, sidewall insert, wirecoat and innerliner.

7. The pneumatic tire of claim 4, wherein the at least one component is a tread.

8. The pneumatic tire of claim 5, wherein the diene based elastomer is selected from the group consisting of solution polymerized styrene-butadiene rubber, emulsion polymerized styrene-butadiene rubber, polybutadiene, natural polyisoprene rubber, and synthetic polyisoprene rubber.

9. The pneumatic tire of claim 5, wherein X is derived from a monomer of formula where $R^1$ and $R^2$ are independent selected from the group consisting of hydrogen, C2 to C6 linear alkyl, C2 to C6 branched alkyl, and C3 to C6 cycloalkyl, with the proviso that at least one of $R^1$ and $R^2$ is not hydrogen.

10. The pneumatic tire of claim 5, wherein X is derived from a polymer selected from the group consisting of poly(N-isopropylacrylamide), poly(N-cyclopropylacrylamide), and poly(N,N-diethylacrylamide).

11. The pneumatic tire of claim 5, wherein the polymer group X capable of exhibiting a lower critical solution temperature has a weight average molecular weight ranging from about 500 to about 20000 g/gmol.

12. The pneumatic tire of claim 5, wherein the polymer capable of exhibiting a lower critical solution temperature has a lower critical solution temperature in a range of from about 0° C. to about 100° C.

13. The pneumatic tire of claim 5, wherein the rubber composition comprises from 0.5 to 10 phr of the compound of formula I.

14. The pneumatic tire of claim 5, wherein n is 2.

15. The pneumatic tire of claim 5, wherein X is of formula where $R^1$ and $R^2$ are independently selected from the group consisting of hydrogen, C2 to C6 linear alkyl, C2 to C6 branched alkyl, and C3 to C6 cycloalkyl, with the proviso that at least one of $R^1$ and $R^2$ is not hydrogen, and m is the degree of polymerization of the hydrocarbon chain.

\* \* \* \* \*